United States Patent [19]

Bögel

[11] Patent Number: 4,909,691

[45] Date of Patent: Mar. 20, 1990

[54] WASHER WITH CONVEXLY CURVED SURFACE

[75] Inventor: Gerhard Bögel, Balgach, Switzerland

[73] Assignee: SFS Stadler AG, Heerbrugg, Switzerland

[21] Appl. No.: 245,132

[22] Filed: Sep. 15, 1988

[30] Foreign Application Priority Data

Sep. 17, 1987 [AT] Austria .................................. 2352/87

[51] Int. Cl.$^4$ ............................................ F16B 43/00
[52] U.S. Cl. ..................................... 411/531; 411/533; 411/544; 405/259
[58] Field of Search ................ 411/368, 369, 531, 542, 411/544, 537, 545; 405/259–261; 52/410, 512

[56] References Cited

U.S. PATENT DOCUMENTS

| 2,334,406 | 11/1943 | Gray . | |
|---|---|---|---|
| 3,090,203 | 5/1963 | Durget | 405/259 |
| 3,238,731 | 3/1966 | Seifert et al. | 405/259 |
| 3,478,523 | 11/1969 | Reusser et al. | 405/259 |
| 4,095,430 | 6/1978 | Hannan | 411/531 |
| 4,102,239 | 7/1978 | Dallas | 411/531 |
| 4,410,296 | 10/1983 | Unrug | 405/259 |
| 4,467,581 | 8/1984 | Francovitch . | |
| 4,518,282 | 5/1985 | Wilcox et al. | 411/531 |

FOREIGN PATENT DOCUMENTS

| 8805487 | 7/1988 | European Pat. Off. . | |
|---|---|---|---|
| 1297817 | 5/1961 | France | 405/259 |

Primary Examiner—Neill R. Wilson
Attorney, Agent, or Firm—Toren, McGeady & Associates

[57] ABSTRACT

In a washer, a central opening is provided for receiving a screw. This large surface-area washer comprises a flat edge area extending so as to be closed with a convexly curved portion adjoining the latter. The central opening is defined by a wall which is conically shaped or comprises one or more steps. The washer serves to fasten parts to an underlying structure, particularly to fasten single-layer or multiple-layer roofing with insulating material on a fixed underlying structure.

15 Claims, 4 Drawing Sheets

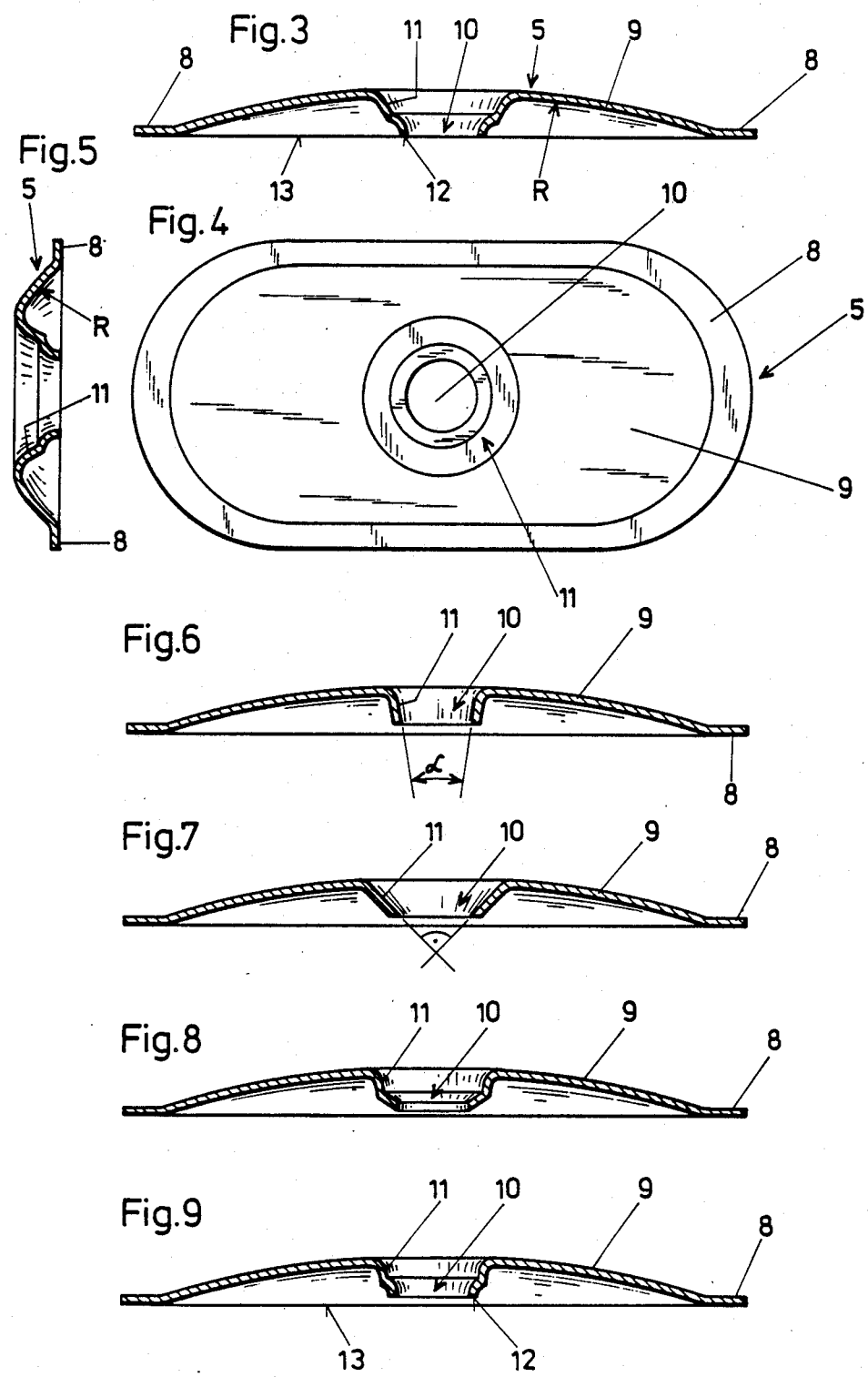

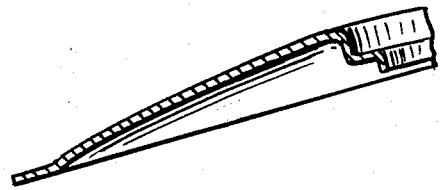
FIG. 14
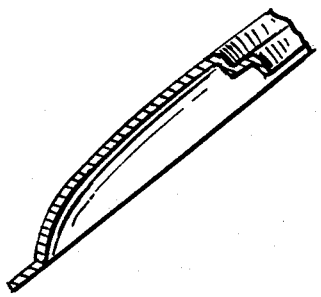
FIG. 15
FIG. 16
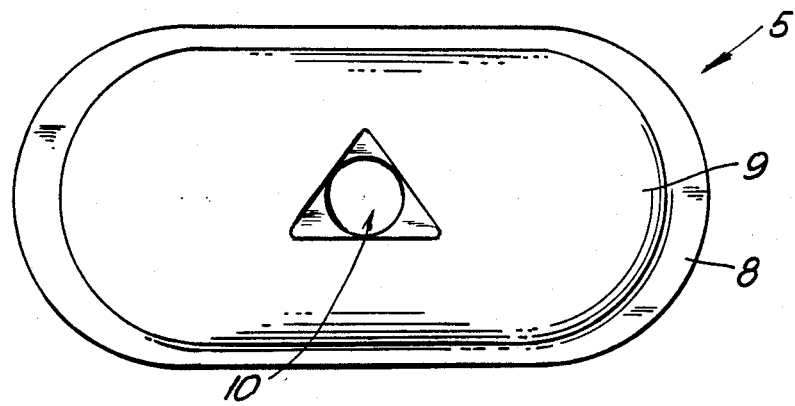
FIG. 17a
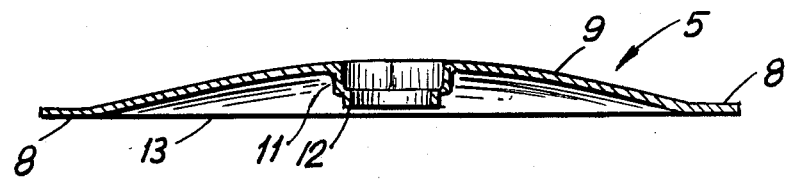
FIG. 17b

WASHER WITH CONVEXLY CURVED SURFACE

BACKGROUND OF THE INVENTION

1. Field of the Invention

The invention is directed to a washer comprising a central opening for receiving a screw, particularly for fastening single-layer or multiple-layer roofing, including an insulating layer, on a fixed underlying structure.

2. Description of the Prior Art

An apparatus for fastening roofing on soft insulating material at a fixed supporting base in which washers having a large surface area are used, the washers being pressed on with a self-boring and automatic thread-cutting screw, is already known (AT-PS 380 051). In such a washer, a central recess is provided in a flat main part for receiving the screw head, wherein an opening for a screw is arranged at the base of this recess. A washer can only be constructed in this way with relatively soft flexible material which must be fastened to a fixed underlying structure. That is, it must be possible to press the central recess of the disk into the part to be fastened.

Fastening arrangements are also known in which a washer consisting of flexible plastic is used (CH-PS 612 718 or DE-OS 35 00 084). In such arrangements, the edge areas, which project outwardly relatively far, are too weak in constructions having a correspondingly large surface area to exert a corresponding drive force, or it is necessary to arrange ribs on the underside or the upper side of the washers, which ribs project radially outwardly from the central opening. However, this again involves substantial problems for magazine loading of the washers. It is essential, especially in series fastening on a roof, that both the screws and the washers be fed to the screwing apparatus in a magazine-loaded form and that they can be readily separated from the magazine and each other. However, such a possibility is excluded if tubular parts which project relatively far in a downward direction are provided at the washer itself for receiving and holding the screw shaft.

In another known construction (DE-GM 78 12 641), a flat washer is provided in which annularly extending flanges are provided coaxially relative to the central through-opening for receiving the screw. Such a construction of a washer is also not suitable for magazine loading and automatic separation in an automatic screw machine, since constant interference would occur because of the transversely extending ribs. The same is also true for washers (FR-PS 1 362 380) in which tips are provided which project downwardly from the flat washers in the direction of the material to be fastened. Also, in such a construction, only a manual single-feed, and accordingly only a manual use of the fastener, is possible.

In another known arrangement (DE-OS 31 37 836), a plastic washer is provided which comprises a cylindrical part for receiving and guiding a screw, which cylindrical part projects forwardly relatively far at the underside of the washer. Also, in this arrangement, ribs, which prevent separation in an automatic screw machine, must be provided at the underside of the washer for achieving the necessary stability. These requirements also apply to a construction according to DE-OS 31 06 844.

Washers on which relatively long, tubular bodies are provided for the displaceable holding of a screw shaft and a screw head are not suitable for preloading in magazine form (GB-PS 1 499 224). In such washers, an orderly load-distributing contact pressing force could only be achieved if the washer itself were equipped with ribs.

SUMMARY AND OBJECTS OF THE INVENTION

The present invention has the object of providing a washer comprising a central opening for receiving a screw, particularly for fastening single-layer or multiple-layer roofing, including an insulating layer on a fixed underlying structure. The washer is sufficiently stiff without an arrangement of supporting ribs and is suitable for fastening fixed facing parts as well as flexible roofing parts. In addition, a construction of a washer which can be preloaded in magazine form in a simple and disturbance-free manner and can be separated by means of an automatic screw machine is disclosed.

This object is met, according to the invention, in that the washer comprises a substantially flat edge area which extends circumferentially and a portion which comprises the central opening and which is curved upwardly in a convex manner and defined by a wall which is conical in shape or which comprises one or more steps and adjoins the edge area.

Sufficient strength and stiffening is achieved by means of the convexly curved portion of the washer without the necessity of supporting ribs. Therefore, no counterboring occurs at the upper side of the washers which could then absorb solvents such as are formed in foil-type roofing welding.

More specifically, in a hot-air welding of foils on a roof, the washer comprises a flat edge area, that is, it ends in a flat manner toward the edge. Accordingly, no gapping of the roofing occurs during welding.

With relatively soft insulation, which is compressed somewhat during the screwing process, the washer, according to the invention, partially fills the resulting depression by means of the convexly curved portion.

In addition, the transverse mobility of the washer, according to the invention, is advantageous during seam fastening in roofing. The washer acts as a secondary restraint in the area of the seam fastening because of the flat edge area.

The wall defining the central opening terminates at the underside at the level of the supporting edge area, or it lies above the latter so that wood can also be worked on directly without counterboring. Accordingly, no difficulties arise in renovation work on roofs with multiple-layer asphalt roofing even during cold weather, since it is not necessary that a depressed area of the washer penetrate into the relatively hard material.

The construction of the washer, according to the invention results in an optimal suitable form for magazine loading; that is, it can be fed to an automatic screw magazine in batches, and it is therefore also possible to easily separate the washers in this automatic screw machine and make them available for screwing. There are no ribs preventing, or at least impeding, the separation.

Another characteristic feature is that the flat edge area and the lower free edge of the wall enclosing the through-opening lie in a plane. Such a construction is particularly advantageous in the fastening of rigid parts, that is, for example, for the direct fastening of wood or the like.

Further, it is suggested that the lower, free edge of the wall enclosing the opening lie above the contact plane formed by the flat edge area. It is then ensured that this edge never projects downwardly below the contact plane of the flat edge area so that the magazine loading and separation of the washers is substantially improved and, in addition, there is never a projecting area which need be pressed into the underlying base before the circumferentially extending edge area comes to rest.

Another feature is that the cross-section of the portion which is curved upward in a convex manner has the shape of a circular-arc segment. This results in simple manufacture of the washer and accordingly also simple manufacture of the work tools required for this purpose.

Other embodiments, depending on the type of loading, disclose a cross-section of the portion which is curved upwardly in a convex manner to have the shape of an elliptic, parabolic or hyperbolic arc segment.

In addition, it is suggested that the cross section of the through-opening defined by the wall be constructed corresponding to the shape of the head of the screw to be inserted. An excellent friction-locking connection between the screw and the washer is accordingly ensured.

In addition, if the wall defining the opening is reduced conically with a cone opening angle of 10° to 30°, preferably 20°, in the screwing in direction, the construction is particularly suitable for the direct use of screw heads and also for the use of intermediate sleeves. In continued screwing in of the screw, its head arrives in the increasingly conically reduced area of the opening, so that the reciprocal friction constantly increases. Accordingly, an additional protection against unscrewing is provided.

If the wall defining the opening angle is of approximately 90°, an optimum construction for use of a countersunk head screw is achieved.

In other embodiments the stepped wall defining the opening is constructed from a first portion—as seen in the screwing in direction—with a triangular, polygonal or non-circular cross-sectional shape and a second portion with a circular cross-sectional shape. In such a construction, a screw head can be used which is square, for example, as seen from the top. A positive-looking connection is accordingly produced between the screw and the washer so that the unscrewing force is substantially increased.

Another embodiment comprises the washer being constructed as a strip-shaped structural component part which terminates at both ends in a semi-circular manner, wherein the radius of the convexly curved portion remains constant in all of the sectional planes intersecting the screwing in axis. Accordingly, there results not only a simple construction of the work tool, but also an optimum stability of the washer in its convexly curved portion.

BRIEF DESCRIPTION OF THE DRAWINGS

In the drawing:

FIG. 3 is a sectional view of the washer of FIG. 2;

FIG. 4 is a plan view of the washer shown in FIG. 2;

FIG. 5 is a sectional view of the washer according to FIG. 2 taken transversely of the sectional view in FIG. 3;

FIGS. 6 to 9 are cross-sectional views of various embodiments of washers according to the invention;

DESCRIPTION OF THE PREFERRED EMBODIMENTS

Figure 1:
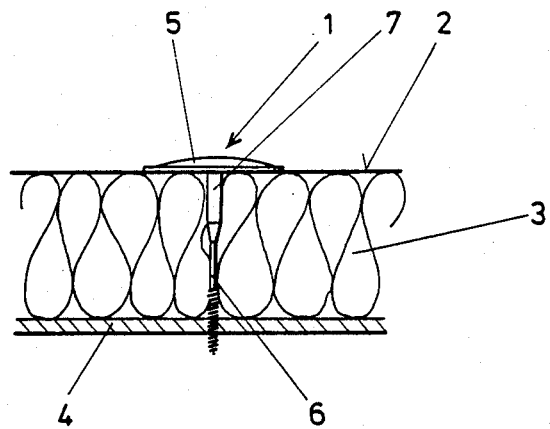
FIG. 1 is a partial sectional view of an embodiment of a washer according to the invention.
Figure 2:
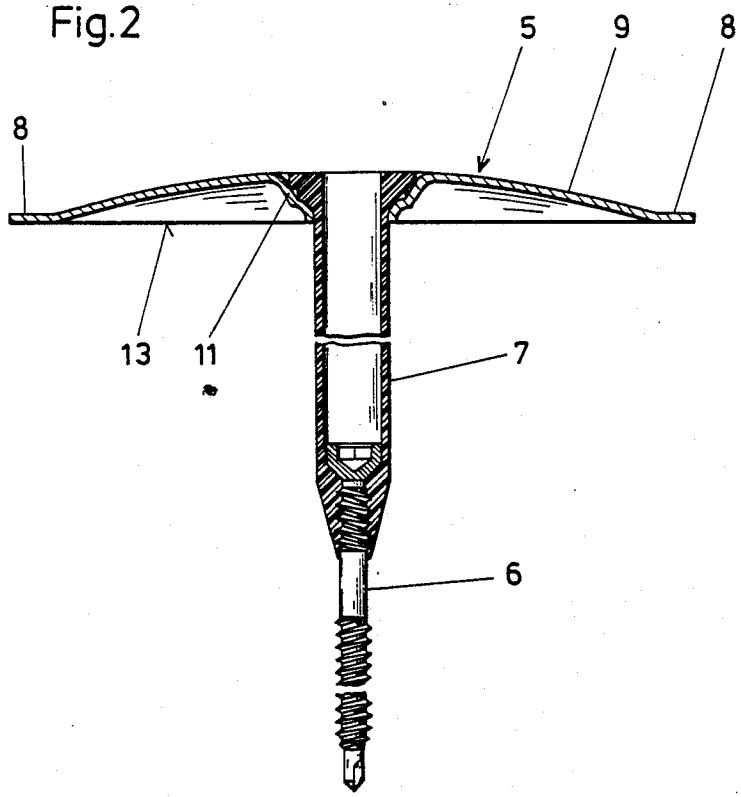
FIG. 2 is an enlarged view of the embodiment, according to FIG. 1, wherein the washer, an intermediate sleeve, and the screw are shown partly in section.

FIG. 1 shows an example of the use of a washer, according to the invention. A fastening element 1 serves to fix single-layer or multiple-layer roofing 2 with an insulating layer 3 on a fixed underlying structure 4. The fastening element 1 comprises a washer 5, a screw 6 and an intermediate sleeve 7 arranged between the washer 5 and the screw 6. Instead of the intermediate sleeve 7, the head of the screw 6 can also engage directly a corresponding recess at the top side of the washer 5. This type of fastening element is shown in FIG. 2 in an enlarged scale and in section.

The washer according to the invention is not restricted to the fastening of single-layer or multiple-layer roofing with an insulating layer on a fixed underlying structure, but can be used with any type of an underlying structure, for example, for fastening covering panels, or the like, onto walls.

A particular embodiment of the washer according to the invention is shown in FIGS. 3 to 5. The washer 5 comprises a flat edge area 8 which extends along the outer circumference of the washer and abuts a convexly curved portion 9 at its inner edge area.

A central opening 10 is defined by a wall 11 which is conically shaped or comprises one or more steps. The conical or stepped configuration of the wall 11 is respectively adapted to the intermediate piece 7 to be inserted or the head shape of the screw to be inserted.

It is particularly advantageous that the flat edge area 8 of the washer 5 lies in a plane so as to be closed along the outer circumference of the washer. A simple transverse movability is accordingly possible in a seam fastening in roofing and this also has positive results in hot-air welding.

The edge area 8 and the lower edge 12 of the wall 11 lie in the same plane 13. Such a construction is particularly advantageous in the fastening of rigid parts, that is, for the direct fastening of wood or the like. However, this construction also has positive results for the fastening of flexible material since the contact pressing force of the washer is transmitted over a large surface area by means of the circumferentially extending edge area 8, and the washer cannot, in itself, be compressed by means of the convexly curved portion 9. In the construction according to FIGS. 3 to 5, the lower edge 12 of the wall 11 can lie above the contact plane 13 of the edge portion 8, just as in the embodiments of FIGS. 6 to 10. All the embodiments have the feature that this lower edge 12 does not come to rest below this contact plane 13, since, on the one hand, the magazine loading and separation of the washers is accordingly substantially improved and, on the other hand, there is never a projecting area which need be pressed into the underlying base before the circumferentially extending edge area 8 comes to rest.

The convexly curved portion 9 of the washer preferably has the shape of a circular-arc segment in cross section, wherein the radius R of the convexly curved portion 9 remains constant in all of the sectional planes intersecting the screwing in axis, that is, the central axis of the opening. This is important especially in the embodiment according to FIG. 4, since in this embodiment the washer is constructed as a strip-shaped structural component part which terminates at both ends in a semi-circular manner. Although the steepness of the area between the edge areas 8 and the central opening 10 changes constantly in the circumferential direction around the opening 10, the radius R remains constant.

In other embodiments of the invention the convexly curved portion has the shape of an elliptic, parabolic or hyperbolic arc segment, note FIGS. 14, 15 and 16, respectively.

The embodiment of FIG. 6 is distinguished from the embodiment of FIG. 3 only in that the wall 11 of the opening 10 is reduced conically in the screwing in direction of the screw to be inserted. The wall 11 encloses a conical opening with a cone opening angle of 10 to 30°, preferably 20°. Such a construction is suitable for the direct use of screw heads, and also for the use of intermediate sleeves 7, wherein an excellent friction-locking connection results relative to the washer in the use of a countersunk head screw which can still be introduced at the upper side of the washer. During the continued screwing in of the screw, its head arrives in the area of the opening which is increasingly reduced conically, so that the reciprocal friction is substantially increased. An additional protection against automatic loosening of the screw connection is accordingly produced.

In the embodiment of FIG. 7 the wall 11 of the opening 10 is reduced with a cone opening angle of approximately 90° in the screwing in direction. This makes it possible to use a countersunk head screw, for example, wherein the bottom of the screw head can be provided with a ribbing, for example, in order to increase the reciprocal friction. In the embodiment according to FIG. 8 opening 10 is defined by a wall 11 which comprises two steps and which could be a combination of the embodiments of FIGS. 3 and 7. Thus, a corresponding adaptation to a predetermined shape of screw head or of a corresponding end part of an intermediate sleeve 7 is provided. The embodiment of FIG. 9 is practically identical to the construction according to FIG. 3 wherein, however, the lower edge 12 of the wall 11 lies just above the contact plane 13 of the peripherally extending edge area 8.

Figure 10:
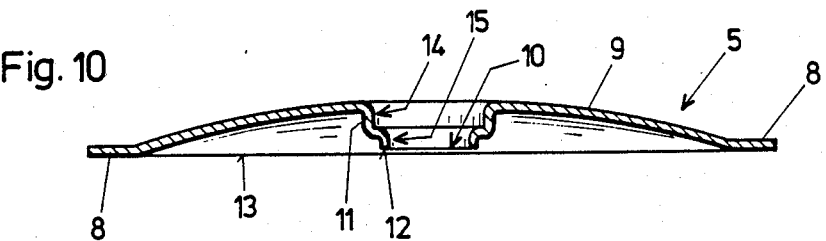
FIGS. 10 and 11 show respectively a sectional and a plan view of another embodiment form of a washer.
Figure 11:
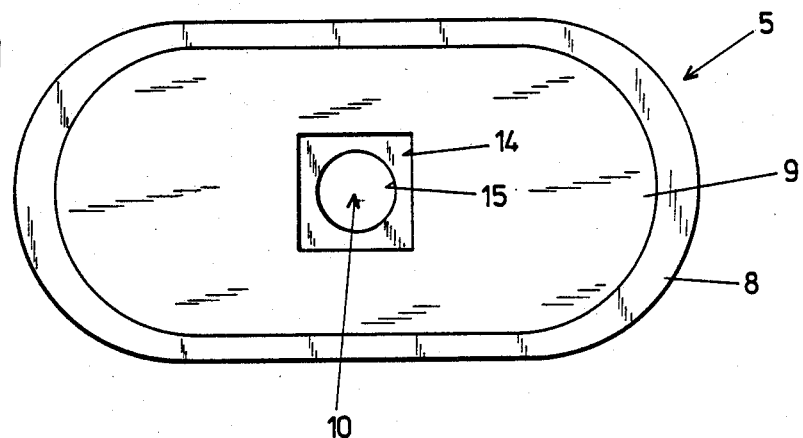

Another embodiment of the washer of the present invention is shown in FIGS. 10 and 11. In this case, the stepped wall 11, which defines the opening, is constructed from a first portion 14—as seen in the screwing in direction—with a square cross-sectional shape, as seen transversely relative to the screwing in direction, and a second portion 15 with a circular cross-sectional shape. In such a construction, a screw head is used, which is square as seen in a top view, the cylindrical shaft adjoining it. An intermediate sleeve 7, which is constructed in the same way, could also be used. A positive-locking connection between the screw and the washer is accordingly produced, so that the unscrewing force is substantially increased, precisely as a result of the large supporting area of the washer 5. This first portion 14 can have any possible cross-sectional shape, that is, it can be constructed so as to be triangular, as shown in FIGS. 17a and 17b, rectangular or noncircular, that is, elliptical, for example.

Figure 12:
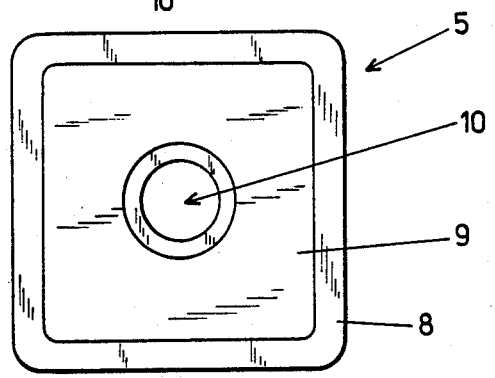
FIGS. 12 and 13 are top views of embodiments of washers according to the present invention.
Figure 13:
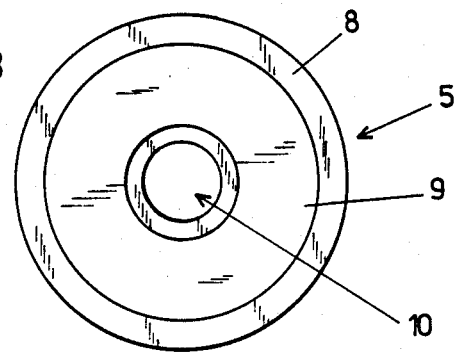

The embodiments of FIGS. 12 and 13 are plan views of washers which have a square or circular circumferential shape. These constructions could apply to all of the cross-sectional shapes shown in FIGS. 3 and 5 to 10.

The washer is preferably punched out of sheet metal and stamped, that is, constructed in one piece. However, it would also be conceivable to manufacture the washer, according to the invention, from a hard plastic or a fiber-reinforced plastic, for example.

In normal design loads, which differ from one country to another, the achieved dimensional stability of the washer, according to the invention, can be used to manufacture longer, one-piece parts. Accordingly, more fastening means can be arranged per washer, so as to enable a so-called linear fastening in a single-level fashion. This would be an ideal complement for perimeter fastening in which a large number of fasteners per square inch is required in order to be able to absorb dynamic loads.

A reinforcement is achieved by means of the washer of the invention such that protection against folding of the washer is provided without the need of additional ribbing. Ribbing usually leads to initial depression and premature folding of the washer. In addition, ribbing always provides collecting points for solution welding agents, which results in uncertain binding of the roofing. If hot air is used for welding, the thickening of the washer should be as slight as possible, particularly in the edge area. The washer according to the invention also meets this requirement. In the washer, according to the invention, the circumferentially extending edge area is dimensioned only to correspond to the material thickness of the washer.

An effortless separation in magazine loaded devices is made possible by means of the simple curvature as a means of reinforcement.

Although preferred embodiments of the invention have been shown herein, other embodiments within the scope of the appended.

What is claimed is:

1. Washer for use with a fastening element such as a screw for securing single or multiple layer roofing in place and for similar attachment, comprising a plate-like member having an opening therethrough with a central axis, said member having a first surface and a second surface, each facing in opposite directions and extending transversely of the central axis, said first surface arranged to face outwardly from the layer to be attached and said second surface arranged to face toward the layer to be attached; said first and second surfaces each having an outer circumference and an inner circumference with the opening located at the inner circumference, each of said first and second surfaces having a planar edge strip extending completely around the outer circumference of the surface and located in a plane perpendicular to the central axis, the first surface being a curved convex surface between the inner circumference and said edge strip, said second surface being a curved concave surface between the inner circumference and the edge strip, and said opening comprises an axially extending tubular wall encircling the central axis and extending from the inner circumference of said first and second surfaces toward the plane of said edge strip, said tubular wall diverging inwardly from the inner circumference toward the plane of the edge strip.

2. The washer of claim 1 wherein said wall is of conical shape.

3. The washer of claim 1, wherein said wall is stepped so as to incrementally vary said central opening's diameter.

4. The washer of claim 1, wherein said flat edge portion and an edge of said wall spaced from said convexly curved first surface lie in a single plane.

5. The washer of claim 1 wherein said convexly curved portion has an elliptical arc segment.

6. The washer of claim 1, wherein said convexly curved first surface has a parabolic arc segment.

7. The washer of claim 1, wherein said convexly curved portion has a hyperbolic arc segment.

8. The washer of claim 1 wherein said opening has a cross-section corresponding to a head shape of a screw to be inserted therein.

9. The washer of claim 2, wherein said wall is reduced conically with a cone opening angle of 10° to 30° in the direction in which the screw enters said opening.

10. The washer of claim 9, wherein said cone opening angle is approximately 20°.

11. The washer of claim 2, wherein said wall is reduced conically with a cone opening angle of 90° in the direction in which a screw enters said opening.

12. A washer for use with a fastening element such as a screw for fastening single or multiple layer roofing material comprising:
  said washer having a central axis and an outer circumferential edge, an edge portion extending around the outer circumferential edge of said washer and having substantially flat opposite surfaces situated in respective planes substantially perpendicular to the central axis of said washer;
  an annular convexly curved portion located inwardly of and abutting said edge portion; and
  a wall connected to and extending from a radially inner edge of said convexly curved portion and defining an opening symmetrical about said central axis of said washer and extending toward a plane containing said edge portion, said wall is stepped so as to incrementally vary said opening diameter, said wall has a portion with a noncircular cross-sectional shape and a second adjacent portion with a circular cross-sectional shape.

13. The washer of claim 12, wherein said noncircular cross-sectional shape is triangular.

14. The washer of claim 12, wherein said noncircular cross-sectional shape is polygonal.

15. A washer for use with a fastening element such as a screw for fastening single or multiple layer roofing material comprising:
  said washer having a central axis and an outer circumferential edge, an edge portion extending around the outer circumferential edge of said washer and having substantially flat opposite surfaces situated in respective planes substantially perpendicular to the central axis of said washer;
  an annular convexly curved portion located inwardly of and abutting said edge portion; and
  a wall connected to and extending from a radially inner edge of said convexly curved portion and defining an opening symmetrical about said central axis of said washer and extending toward a plane containing said edge portion, said wall is strip-shaped having two long sides and two short sides, and said short sides are semicircular, and the radius of said convexly curved portion is constant in all sectional planes intersecting the axis of said central opening.

* * * * *